A. L. JOHNSON.
QUACK GRASS DESTROYER.
APPLICATION FILED SEPT. 15, 1920.
1,387,725.
Patented Aug. 16, 1921.
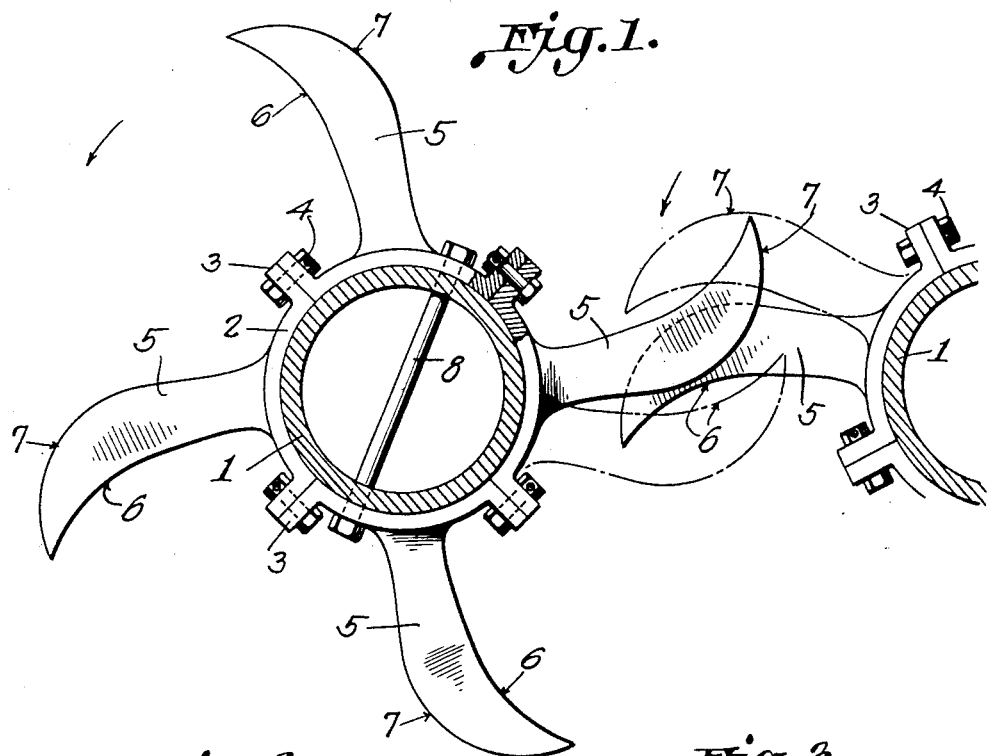
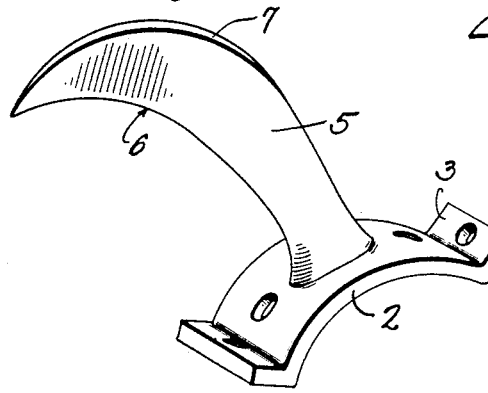
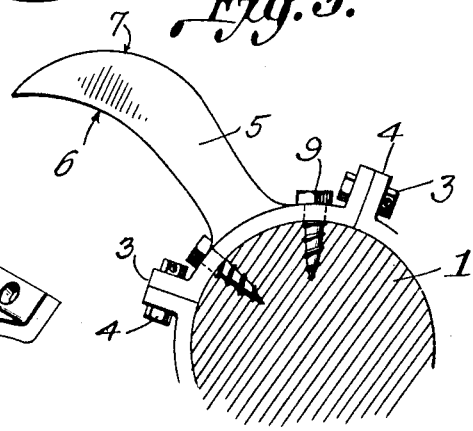
Inventor,
Alfred L. Johnson

UNITED STATES PATENT OFFICE.

ALFRED L. JOHNSON, OF BOARDMAN, WISCONSIN.

QUACK-GRASS DESTROYER.

1,387,725.  Specification of Letters Patent.  Patented Aug. 16, 1921.

Application filed September 15, 1920. Serial No. 410,575.

*To all whom it may concern:*

Be it known that I, ALFRED L. JOHNSON, a citizen of the United States, residing at Boardman, in the county of St. Croix and State of Wisconsin, have invented a new and useful Improvement in Quack-Grass Destroyers, of which the following is a specification.

This invention relates to quack grass destroyers and it consists in the novel features hereinafter described and claimed.

An object of the invention is to provide means for destroying or exterminating quack grass or similar wire grasses by engaging the grass while it is at the surface of the soil and cutting the same into sections or fragments which are left at the surface of the soil and which are killed or dried out by the action of the sun.

With this object in view the invention contemplates and includes two or more shafts journaled for rotation and spaced from each other. Blades are mounted upon the shafts and the said blades are of special design and configuration and the blades upon one shaft are adapted to coöperate with the blades upon the next adjacent shaft in severing or cutting the grass into the sections or fragments. Each blade includes an arcuate shoulder portion adapted to bear against the periphery of the shaft and having at its ends outstanding lugs. The lugs of one shoulder portion are adapted to be bolted or otherwise secured to the lugs of the adjacent shoulder portion. The blades proper are mounted at the intermediate parts of the shoulder portion and are disposed outwardly from the axis of the shaft when the shoulder portion is applied. The blades are curved longitudinally and are substantially scimiter in shape. The blades upon the adjacent shaft overlap each other and inasmuch as the shafts rotate in the same direction the blades of one shaft are moving upwardly at the rear of the said shaft while the blades upon the next adjacent shaft are moving downwardly from the upper portion of the shaft, consequently the blades which are moving upwardly encounter the grass and lift the same while the blades which are moving downwardly come in contact with the lifted grass and the blades coöperate with each other in severing the grass into particles.

In the accompanying drawing:

Figure 1 is a fragmentary sectional view of shafts with the blades applied.

Fig. 2 is a perspective view of one of the blades.

Fig. 3 is a side elevation of one of the blades applied to a shaft.

As illustrated in the accompanying drawing the shafts to which the blades are applied are indicated at 1 and the shafts may be journaled for rotation in a suitable frame (not shown). The blade members include arcuate shoulder portions 2 having at their ends outstanding lugs 3. Bolts 4 pass through the adjacent lugs 3 and secure the shoulder portions 2 about the periphery of the shafts 1. Each blade member also includes an outstanding blade 5 which is curved longitudinally and which is provided with a cutting edge 6 and a rear edge 7. The inner portions of the blades 5 are substantially radially disposed with relation to the center of the shaft 1 when the blade members are applied and the said blades are curved in the direction in which they rotate.

As illustrated in Fig. 1 of the drawing the end portions of the blades upon the two shafts 1 overlap each other. The blades as they pass under the shafts are adapted to come in contact with the ground. Therefore the pointed ends of the blades upon the forward shaft pass under the quack grass or other wire grass and as the blades move in an upward direction the grass is lifted and the blades upon the next succeeding shaft pass through the spaces between the blades upon the preceding shaft and consequently they are moving in a downward direction and they come in contact with the grass which is lifted by the first mentioned blade and the grass is cut into bits or sections and left upon the surface of the ground where it is acted upon by the sun as hereinbefore indicated.

The shoulder portion 5 may be restrained against turning with relation to the shafts 1 by means of bolts 8 which pass transversely through the shafts and the shoulder portions or they may be held in position by means of screws 9 which pass through the shoulder portions and enter the shaft as indicated in Fig. 3 of the drawing. In Fig. 1 hollow metallic shafts are illustrated while in Fig. 3 a solid wood shaft is illustrated.

Having described the invention what is claimed is:

A blade adapted to be used for destroying grasses, comprising an arcuate shoulder portion, the ends of the said shoulder portion being flattened and forming a plane surface in alinement with the radius of the arc of the shoulder portion, a blade extending outwardly from the shoulder portion and located at a point approximately midway between the ends of the arcuate portion, the inner portion of the blade being disposed approximately in alinement with the radius of the arc of the shoulder portion and the outer portion of the blade being curved longitudinally, the blade being provided with a curved cutting edge and a curved rear edge, which edges intersect each other and the outer end of the blade in the form of an acuminate angle.

ALFRED L. JOHNSON.